United States Patent
Rey et al.

(10) Patent No.: US 11,153,481 B2
(45) Date of Patent: Oct. 19, 2021

(54) CAPTURING AND TRANSFORMING WIDE-ANGLE VIDEO INFORMATION

(71) Applicant: STX Financing, LLC, Burbank, CA (US)

(72) Inventors: Richard Rey, Los Angeles, CA (US); Andrew Vick, Los Angeles, CA (US); Bettina Martin, Burbank, CA (US)

(73) Assignee: STX Financing, LLC, Burbank, CA (US)

( * ) Notice: Subject to any disclaimer, the term of this patent is extended or adjusted under 35 U.S.C. 154(b) by 0 days.

(21) Appl. No.: 16/355,614

(22) Filed: Mar. 15, 2019

(65) Prior Publication Data

US 2020/0296281 A1 Sep. 17, 2020

(51) Int. Cl.

| H04N 5/232  | (2006.01) |
| H04N 5/262  | (2006.01) |
| H04N 13/117 | (2018.01) |
| H04N 13/189 | (2018.01) |
| H04N 13/383 | (2018.01) |

(52) U.S. Cl.
CPC ....... H04N 5/23238 (2013.01); H04N 5/2628 (2013.01); H04N 13/117 (2018.05); H04N 13/189 (2018.05); H04N 13/383 (2018.05)

(58) Field of Classification Search
CPC .......... H04N 5/23238; H04N 5/23216; H04N 5/2628; H04N 13/117; H04N 13/189; H04N 13/383; H04N 5/2259; G06T 3/0018; G06T 3/0062; G06T 5/006; G08B 13/19628
See application file for complete search history.

(56) References Cited

U.S. PATENT DOCUMENTS

| 5,359,363 A  | * | 10/1994 | Kuban  | G06T 3/0018 348/36 |
| 5,384,588 A  | * | 1/1995  | Martin | G06T 3/0018 348/14.1 |
| 6,002,430 A  | * | 12/1999 | McCall | H04N 5/23238 348/143 |
| 6,028,584 A  | * | 2/2000  | Chiang | G06T 3/0062 345/628 |
| 6,243,131 B1 | * | 6/2001  | Martin | G06T 3/0018 348/36 |
| 7,893,985 B1 | * | 2/2011  | Ahiska | H04N 5/2259 348/335 |
| 8,798,451 B1 | * | 8/2014  | Kweon  | G06T 3/0018 396/20 |

(Continued)

FOREIGN PATENT DOCUMENTS

WO   2018032457   2/2018

*Primary Examiner* — David E Harvey
(74) *Attorney, Agent, or Firm* — Sheppard, Mullin, Richter & Hamtpon LLP

(57) ABSTRACT

Systems and methods for capturing and transforming wide-angle video information are disclosed. Exemplary implementations may: guide light to an image sensor by a fisheye lens; capture wide-angled video information having a horizontal angle-of-view of 200 degrees or more and a vertical angle-of-view of 180 degrees or more; select a portion of the captured wide-angled video information; transform the selected portion into a rectilinear projection that represents the video sequence; and transform the rectilinear projection into a viewable video sequence that has a format suitable for playback in a virtual reality headset.

21 Claims, 10 Drawing Sheets

(56) References Cited

U.S. PATENT DOCUMENTS

| | | | |
|---|---|---|---|
| 9,219,860 B1* | 12/2015 | Kozko | H04N 5/247 |
| 10,402,938 B1* | 9/2019 | Newman | H04N 5/2624 |
| 10,438,332 B2* | 10/2019 | Clark, II | G06T 5/006 |
| 10,601,889 B1* | 3/2020 | Doron | H04L 65/607 |
| 10,666,941 B1* | 5/2020 | Doron | H04N 21/47217 |
| 2004/0095470 A1* | 5/2004 | Tecu | H04N 5/3572 |
| | | | 348/207.99 |
| 2005/0007477 A1* | 1/2005 | Ahiska | H04N 5/217 |
| | | | 348/335 |
| 2005/0259118 A1* | 11/2005 | Mojaver | H04N 5/2628 |
| | | | 345/647 |
| 2008/0007617 A1* | 1/2008 | Ritchey | H04N 7/18 |
| | | | 348/37 |
| 2009/0041378 A1* | 2/2009 | Yamaoka | H04N 5/2628 |
| | | | 382/275 |
| 2010/0208032 A1* | 8/2010 | Kweon | G06T 1/00 |
| | | | 348/36 |
| 2012/0098926 A1* | 4/2012 | Kweon | G06T 3/0037 |
| | | | 348/36 |
| 2012/0250937 A1* | 10/2012 | Corcoran | H04N 5/217 |
| | | | 382/103 |
| 2013/0265468 A1* | 10/2013 | Morimura | H04N 5/23238 |
| | | | 348/240.2 |
| 2014/0104424 A1* | 4/2014 | Zhang | H04N 5/23238 |
| | | | 348/148 |
| 2014/0176542 A1* | 6/2014 | Shohara | G06T 15/205 |
| | | | 345/420 |
| 2014/0340473 A1* | 11/2014 | Artonne | H04N 5/2252 |
| | | | 348/36 |
| 2014/0368606 A1* | 12/2014 | Bassi | H04N 13/305 |
| | | | 348/36 |
| 2015/0062292 A1* | 3/2015 | Kweon | H04N 5/23238 |
| | | | 348/37 |
| 2015/0178884 A1* | 6/2015 | Scholl | G06T 3/0018 |
| | | | 348/36 |
| 2016/0269632 A1* | 9/2016 | Morioka | G06T 3/4038 |
| 2016/0277772 A1* | 9/2016 | Campbell | H04N 21/47 |
| 2016/0301870 A1* | 10/2016 | Matsuoka | H04N 5/23254 |
| 2016/0323560 A1* | 11/2016 | Jin | H04N 5/23238 |
| 2016/0353090 A1* | 12/2016 | Esteban | H04N 13/221 |
| 2016/0377869 A1* | 12/2016 | Lee | G02B 27/0172 |
| | | | 359/631 |
| 2017/0024851 A1 | 1/2017 | Baran | |
| 2017/0330311 A1* | 11/2017 | Suzuki | G06T 7/11 |
| 2018/0084257 A1* | 3/2018 | Abbas | H04N 19/147 |
| 2018/0084283 A1 | 3/2018 | Walkingshaw | |
| 2018/0103195 A1* | 4/2018 | Kim | H04N 5/23216 |
| 2018/0286012 A1* | 10/2018 | Dolzhenko | G06T 3/0056 |
| 2018/0302614 A1* | 10/2018 | Toksvig | H04N 17/002 |
| 2018/0343472 A1* | 11/2018 | Wang | H04N 19/176 |
| 2018/0374192 A1* | 12/2018 | Kunkel | G06T 3/0087 |
| 2018/0376126 A1* | 12/2018 | Hannuksela | H04N 19/30 |
| 2019/0014260 A1* | 1/2019 | Mu | H04N 5/23238 |
| 2019/0086679 A1* | 3/2019 | Ratcliff | G02B 27/0172 |
| 2019/0191110 A1* | 6/2019 | Mayle | H04N 5/2253 |
| 2019/0222824 A1* | 7/2019 | Sheridan | H04N 5/00 |
| 2019/0347775 A1* | 11/2019 | Suitoh | G06T 3/0062 |
| 2020/0021727 A1* | 1/2020 | Ikeda | H04N 7/18 |
| 2020/0068131 A1* | 2/2020 | Tadano | G06T 5/006 |
| 2020/0174262 A1* | 6/2020 | Godar | H04N 13/268 |
| 2020/0202498 A1* | 6/2020 | Raduta | G06T 3/0018 |

* cited by examiner

CAPTURING AND TRANSFORMING WIDE-ANGLE VIDEO INFORMATION

FIELD OF THE DISCLOSURE

The present disclosure relates to systems and methods for capturing and transforming wide-angle video information, in particular for playback using a virtual reality headset in a manner that provides an immersive user experience.

BACKGROUND

Using a fisheye lens to capture images having a 360-degree horizontal angle-of-view is known. Playing back such video information in a headset is known.

SUMMARY

One aspect of the present disclosure relates to a system configured for capturing and transforming wide-angle video information. The system may include one or more hardware processors configured by machine-readable instructions. The processor(s) may be configured to guide light to an image sensor by a fisheye lens. The processor(s) may be configured to capture, by the image sensor, wide-angled video information having a horizontal angle-of-view of 200 degrees or more and a vertical angle-of-view of 180 degrees or more. The wide-angled video information may be based on light that becomes incident on the image sensor. The wide-angled video information may represent a video sequence. The processor(s) may be configured to select a portion of the captured wide-angled video information. The selected portion may have a vertical angle-of-view of fewer degrees than its horizontal angle-of-view. The processor(s) may be configured to transform the selected portion into a rectilinear projection that represents the video sequence. The rectilinear projection may have a horizontal angle-of-view of between 200 degrees and 250 degrees. The rectilinear projection may have a vertical angle-of-view of 180 degrees or more. The selected portion may have a vertical angle-of-view of fewer degrees than its horizontal angle-of-view. The processor(s) may be configured to transform the rectilinear projection into a viewable video sequence that has a format suitable for playback in a virtual reality headset. The processor(s) may be configured to store the viewable video sequence in electronic storage.

Another aspect of the present disclosure relates to a method for capturing and transforming wide-angle video information. The method may include guiding light to an image sensor by a fisheye lens. The method may include capturing, by the image sensor, wide-angled video information having a horizontal angle-of-view of 200 degrees or more and a vertical angle-of-view of 180 degrees or more. The wide-angled video information may be based on light that becomes incident on the image sensor. The wide-angled video information may represent a video sequence. The method may include selecting a portion of the captured wide-angled video information. The selected portion may have a vertical angle-of-view of fewer degrees than its horizontal angle-of-view. The method may include transforming the selected portion into a rectilinear projection that represents the video sequence. The rectilinear projection may have a horizontal angle-of-view between 200 degrees and 250 degrees. The rectilinear projection may have a vertical angle-of-view of 180 degrees or more. The rectilinear projection may have a vertical angle-of-view of fewer degrees than its horizontal angle-of-view. The method may include transforming the rectilinear projection into a viewable video sequence that has a format suitable for playback in a virtual reality headset. The method may include storing the viewable video sequence in electronic storage.

As used herein, any association (or relation, or reflection, or indication, or correspondency) involving lenses, sensors, angles, selected portions, projections, formats, vertical lines, pixels, and/or another entity or object that interacts with any part of the system and/or plays a part in the operation of the system, may be a one-to-one association, a one-to-many association, a many-to-one association, and/or a many-to-many association or N-to-M association (note that N and M may be different numbers greater than 1).

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect. As used herein, the term "determine" (and derivatives thereof) may include measure, calculate, compute, estimate, approximate, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
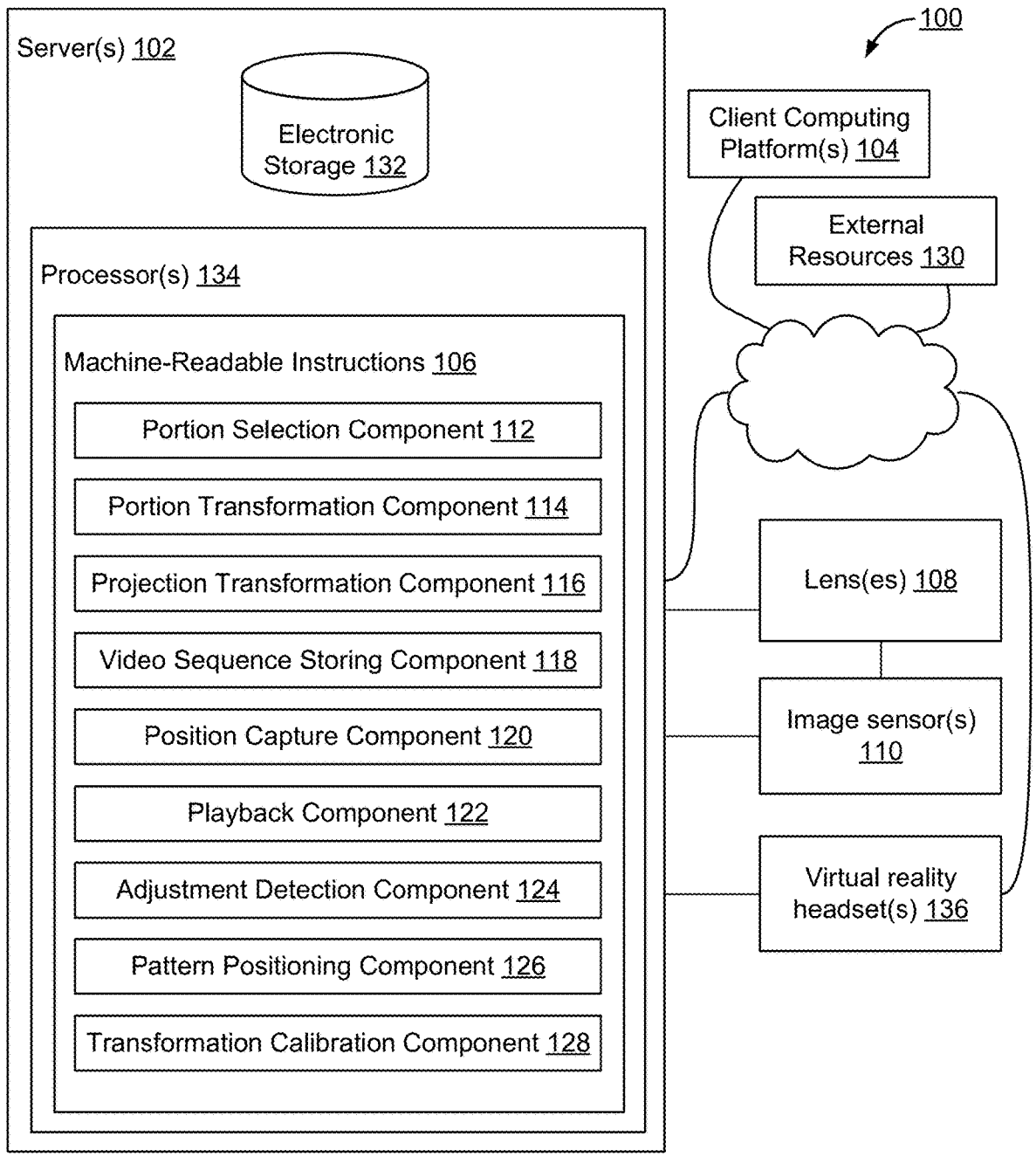
FIG. 1 shows a system configured for capturing and transforming wide-angle video information, in accordance with one or more implementations.

FIG. 1 illustrates a system 100 configured for capturing and transforming wide-angle video information, in accordance with one or more implementations. Once transformed, the wide-angle video information can be played back using a virtual reality headset in a manner that provides an immersive user experience. Conventional playback of video information through, e.g., a virtual reality headset is limited in the experience of the viewer, especially at the periphery of the viewer's vision. In particular, the common horizontal and vertical angle-of-view do not provide an immersive experience, leaving a viewer less engaged in the story being told.

System 100 may include one or more lenses 108, image sensors 110, virtual reality headsets 136, servers 102, and/or other components. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104.

Lens(es) 108 may be configured to guide light to an image sensor. In some implementations, lens 108 may include a fisheye lens. Lens 108 may have a focal length of about 2 mm, about 3 mm, about 4 mm, and/or other focal lengths. Lens 108 may have a horizontal angle-of-view of about 270 degrees, about 250 degrees, about 230 degrees, about 200 degrees, and/or another horizontal angle-of-view. Lens 108 may have a vertical angle-of-view of about 270 degrees, about 250 degrees, about 230 degrees, about 200 degrees, and/or another vertical angle-of-view. In some implementations, lens 108 may have a horizontal angle-of-view of a similar number of degrees as its vertical angle-of-view. In some implementations, lens 108 may be an ENTANIYA™ 3 mm fisheye lens having a horizontal angle-of-view of 250 degrees.

Image sensor(s) 110 may be configured to capture wide-angled video information. In some implementations, wide-angled video information may have a horizontal angle-of-view of at least 200 degrees and a vertical angle-of-view of at least 180 degrees, e.g., as captured by image sensor 110. In some implementations, image sensor 110 may capture wide-angled video information in at least 60 frames-per-second. In some implementations, image sensor 110 may capture wide-angled video information at a resolution of 8192×4096 pixels. In some implementations, image sensor 110 may capture wide-angled video information at a resolution greater than 8192×4096 pixels. In some implementations, the captured video information is a center extract in 6:5 aspect ratio, and the resolution is 5184×4320 pixels or greater. The wide-angled video information may be based on light that becomes incident on the image sensor, e.g., as guided by lens 108. The wide-angled video information may represent a video sequence. In some implementations, image sensor 110 may be a HELIUM™ 8K S35 sensor.

Figure 3:
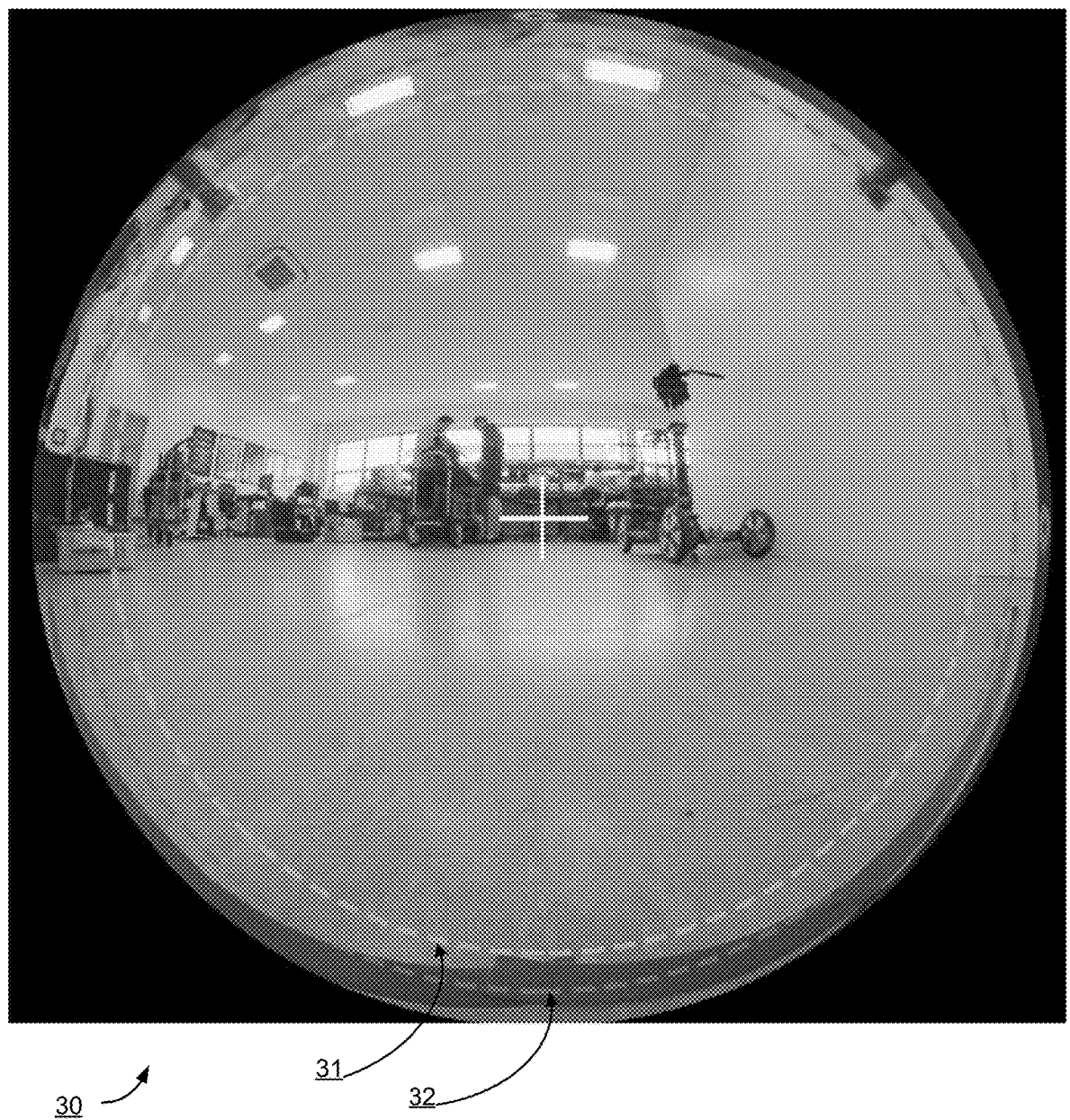
FIG. 3 illustrates an exemplary image representing captured wide-angled visual information, as may be used by the system in accordance with one or more implementations.

By way of non-limiting example, FIG. 3 illustrates an exemplary image 30 representing wide-angled visual information as captured using a fisheye lens. Inner dotted line 31 corresponds to an angle-of-view of 180 degrees. Outer dotted line 32 corresponds to an angle-of-view of 200 degrees.

Server(s) 102 may be configured by machine-readable instructions 106. Machine-readable instructions 106 may include one or more instruction components. The instruction components may include computer program components. The instruction components may include one or more of a portion selection component 112, a portion transformation component 114, a projection transformation component 116, a video sequence storing component 118, a position capture component 120, a playback component 122, an adjustment detection component 124, a pattern positioning component 126, a transformation calibration component 128, and/or other instruction components.

Portion selection component 112 may be configured to select a portion of the captured wide-angled video information. The selected portion may be smaller than the entire captured wide-angled video information. For example, the selected portion may have a horizontal angle-of-view that is fewer degrees than the horizontal angle-of-view of the captured wide-angled video information. For example, the selected portion may have a vertical angle-of-view that is fewer degrees than the vertical angle-of-view of the captured wide-angled video information. In some implementations, the selected portion may have a horizontal angle-of-view of at least 200 degrees and no more than 250 degrees. In some implementations, the selected portion may have a vertical angle-of-view of at least 180 degrees. In some implementations, the selected portion may have a vertical angle-of-view of fewer degrees than its horizontal angle-of-view. In some implementations, the selected portion may be centered horizontally in the captured wide-angled video information.

Portion transformation component 114 may be configured to transform some or all of the captured wide-angled video information into a projection. This projection may be referred to as the resulting projection. In some implementations, portion transformation component 114 may be configured to transform the selected portion of the captured wide-angled video information into a projection. In some implementations, the resulting projection may be a rectilinear projection. In some implementations, the resulting projection may represent a video sequence, e.g., the video sequence captured by image sensor 110. In some implementations, the resulting projection may include more than a threshold percentage of the information in the selected portion. For example, the threshold percentage may be 80%, 90%, 95%, 98%, and/or another percentage. In some implementations, the resulting projection may have a horizontal angle-of-view of at least 200 degrees and no more than 250 degrees. In some implementations, the resulting projection may have a horizontal angle-of-view ranging between 220 and 250 degrees. In some implementations, the resulting projection may have a vertical angle-of-view of at least 180 degrees. In some implementations, the vertical angle-of-view of the resulting projection may have fewer degrees than the horizontal angle-of-view of the resulting projection.

In some implementations, transforming the selected portion into a rectilinear projection may be performed such that vertical lines in captured real-world images (i.e., images without the radial distortion—or barrel distortion—common to fisheye lenses) correspond to vertical lines in the rectilinear projection. In some implementations, transforming the selected portion into the rectilinear projection may be performed such that vertical lines as viewed by humans viewing a real-world scene correspond to vertical lines in the rectilinear projection of the same captured scene. In some implementations, the transformation into the rectilinear projection may be performed such that vertical lines in the center of the captured real-world images more closely correspond to vertical lines in the rectilinear projection than vertical lines near the periphery of the captured real-world images. In some implementations, the resulting projection may be a perspective projection.

In some implementations, portion transformation component 114 may be configured to transform the selected portion of the captured wide-angled video information into the resulting projection such that objects of similar vertical height as viewed by humans viewing a real-world scene have similar vertical height in the resulting projection of the same captured scene. In other words, vertical distortion may be addressed by portion transformation component 114 as part of the same transformation or through an additional transformation such that an object in the center of an image does not appear greater or smaller than the same object in the periphery of the image.

Figure 4:
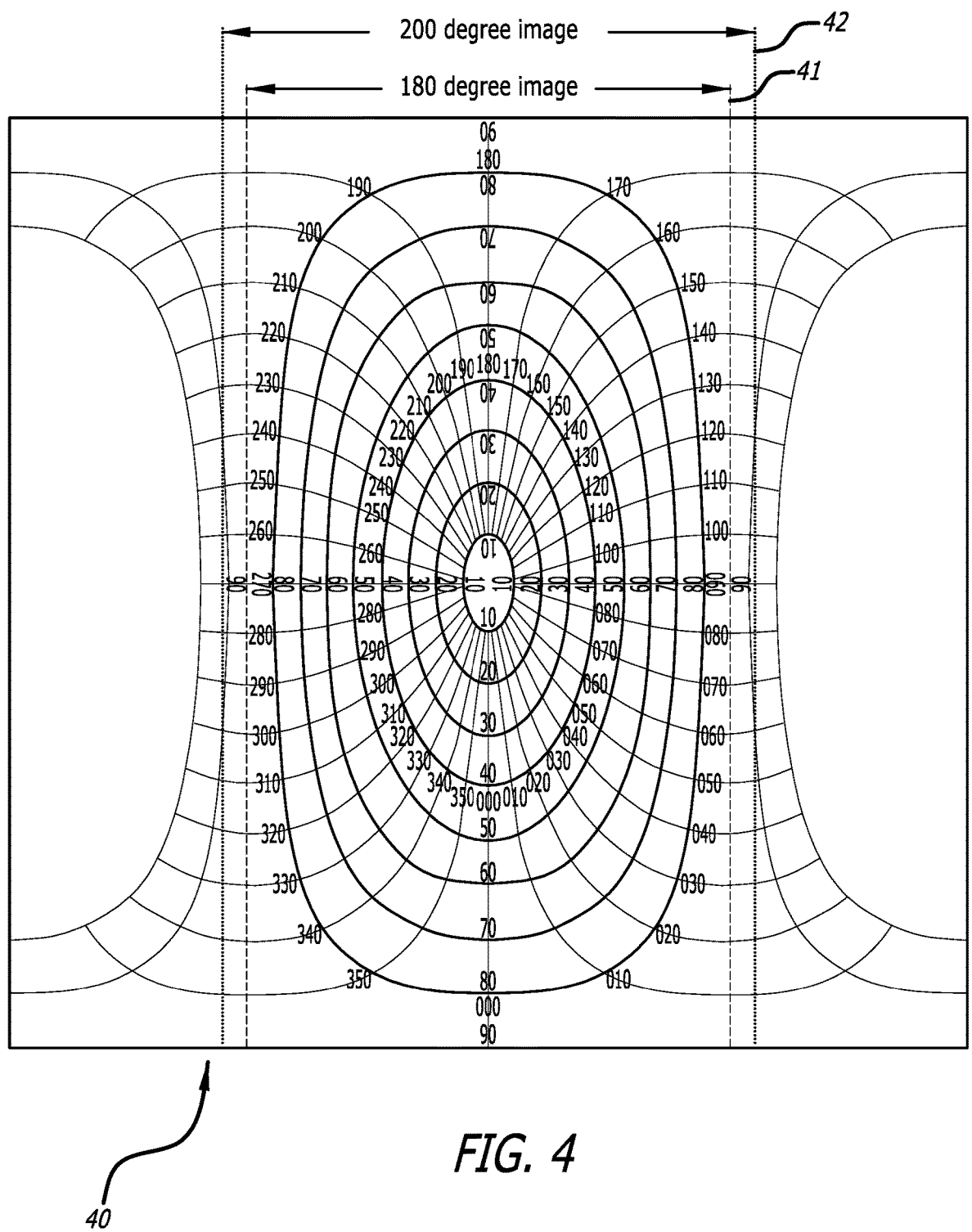
FIG. 4 illustrates an exemplary image representing a rectilinear projection, as may be used by the system in accordance with one or more implementations.

By way of non-limiting example, FIG. 4 illustrates an exemplary image 40 representing a rectilinear projection based on a transformation of captured wide-angled visual information. Boundary 41 corresponds to an image having a horizontal angle-of-view of 180 degrees (this is the inner dotted rectangle). Boundary 42 corresponds to an image having a horizontal angle-of-view of 200 degrees (this is the outer dotted rectangle, using smaller dots than the inner dotted rectangle).

Projection transformation component 116 may be configured to transform a projection into a viewable video sequence. For example, the projection may be the rectilinear projection produced by portion transformation component 114. In some implementations, the viewable video sequence may have a format suitable for playback in a virtual reality headset, such as virtual reality headset 136. In some implementations, transforming a rectilinear projection into a viewable video sequence may be performed such that the format suitable for playback in the virtual reality headset is a proprietary lat-long format (i.e., latitude-longitude format). In some implementations, the proprietary lat-long format may be compressed horizontally. In some implementations, a standard lat-long format may be used. In some implementations, horizontal compression may be performance such that a first sub-portion in the center of the captured wide-angled video information (or the projection) is compressed less than a second sub-portion at the periphery of the captured wide-angled video information (or the projection). In some implementations, transforming the rectilinear projection into the viewable video sequence may be performed such that the format suitable for playback in the virtual reality headset is panoramic. In some implementations, transforming the rectilinear projection into the viewable video sequence may be performed such that the format suitable for playback in the virtual reality headset is stereoscopic.

Figure 5:
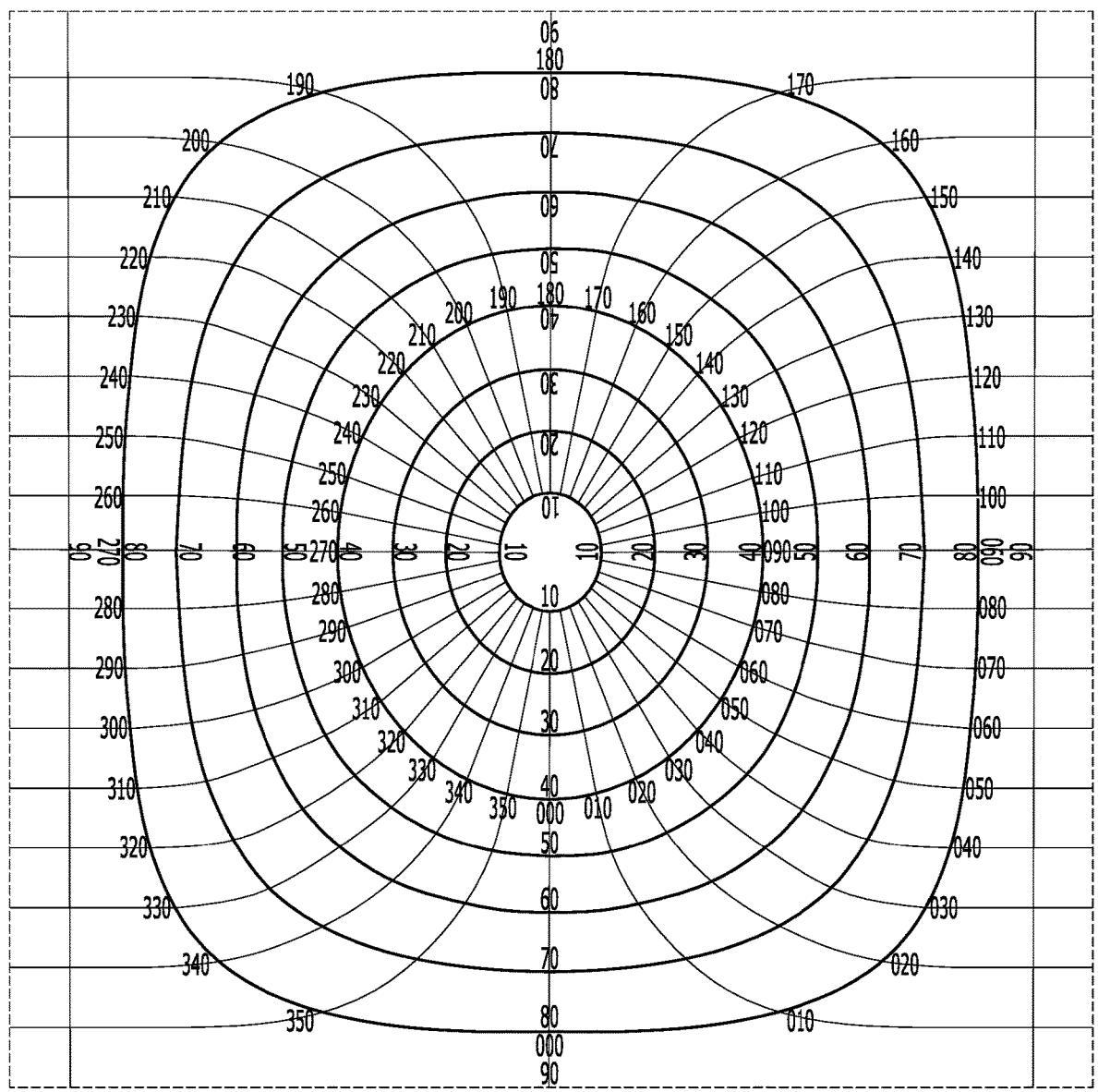
FIG. 5 illustrates an exemplary image representing horizontal compression of an image, as may be used by the system in accordance with one or more implementations.
Figure 5:
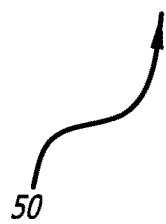

By way of non-limiting example, FIG. 5 illustrates an exemplary image 50 representing horizontal compression, wherein image 50 (within the dotted rectangle) has a horizontal angle-of-view of 200 degrees, and a vertical angle-of-view having fewer degrees than its horizontal angle-of-view. By compressing horizontally, the resulting image has a horizontal resolution that is equal to the vertical resolution. In some implementations, the resolution of image 50 may be 4 k×4 k pixels (e.g., 4096×4096 pixels). Other resolutions are contemplated within the scope of this disclosure, including square resolutions. Image 50 may be a compressed version of the area indicated in FIG. 4 by boundary 42 (the outer dotted rectangle in FIG. 4).

Referring to FIG. 1, transforming the rectilinear projection into a viewable video sequence may be performed such that the format suitable for playback in a virtual reality headset is cylindrical and/or spherical. In some cases, a first portion of the information used for playback in virtual reality headset 136 may be based on the captured wide-angled video information (or the projection), while a second portion of the information used for playback in virtual reality headset 136 may be computer-generated imagery, e.g., independent of the captured wide-angled video information (or the projection). In some implementations, the second portion may represent a static virtual environment. In some implementations, the second portion may represent a dynamic virtual environment that changes during playback.

Figure 6:
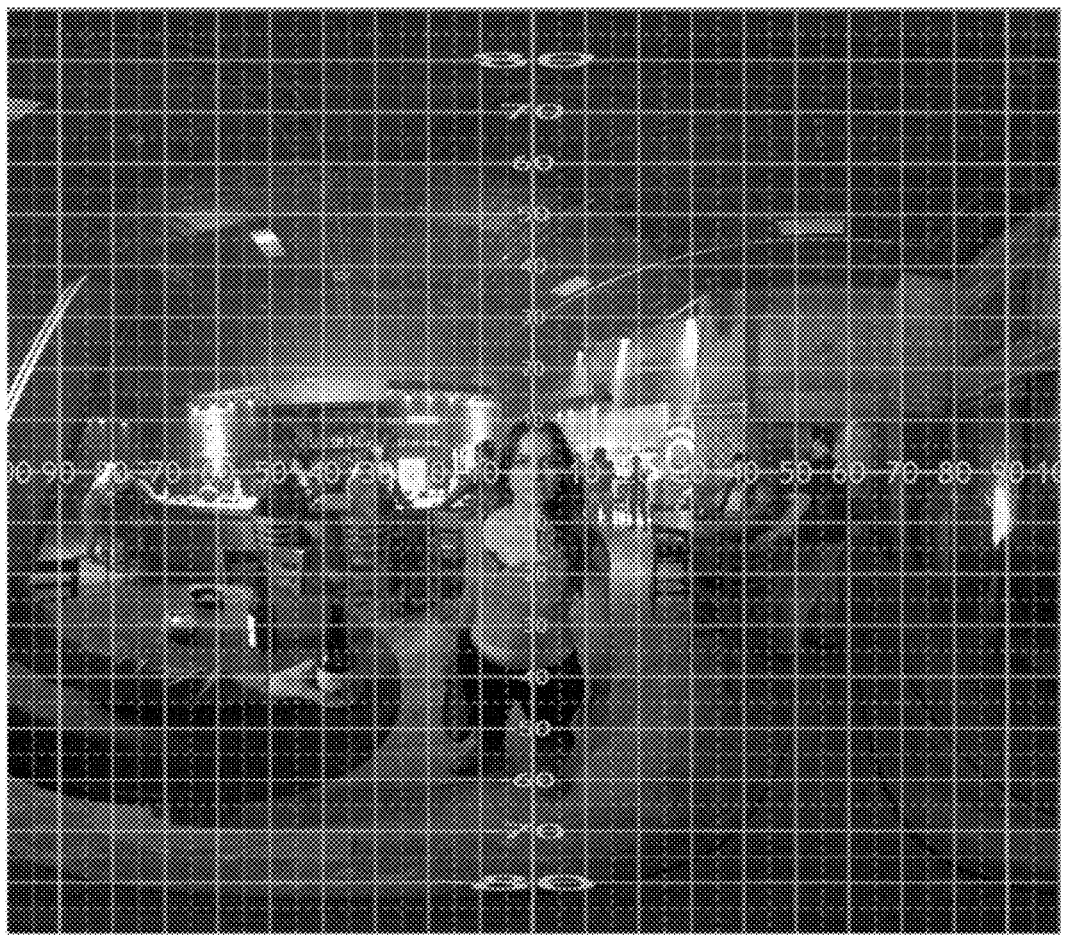
FIG. 6 illustrates an exemplary image representing an image in a viewable video sequence, as may be used by the system in accordance with one or more implementations.

By way of non-limiting example, FIG. 6 illustrates an exemplary image 60 representing a moment of a viewable video sequence (with a superimposed grid). The viewable video sequence may be based on wide-angled video information captured using lens 108 and image sensor 110 (see FIG. 1). By virtue of the operations performed as described in this disclosure (including but not limited to operations by portion selection component 112, portion transformation component 114, projection transformation component 116, video sequence storing component 118, and/or other components of system 100), image 60 may be part of a highly immersive experience via playback through a virtual reality headset, with low levels of distortion. In particular the center of image 60 may have little to none of the barrel distortion common with fisheye lenses. Image 60 may have a horizontal angle-of-view of at least 200 degrees and no more than 250 degrees, a vertical angle-of-view of at least 180 degrees, and a horizontal angle-of-view having a greater number of degrees than the vertical angle-of-view.

Referring to FIG. 1, video sequence storing component 118 may be configured to store the viewable video sequence in electronic storage. In some implementations, the stored viewable video sequence may have a resolution of at least 3840×2160 pixels. In some implementations, the stored video sequence may have a resolution between 3840×2160 pixels and 8192×4096 pixels. In some implementations, the stored video sequence is a center extract in 6:5 aspect ratio, and the resolution is 5184×4320 pixels or greater. In some implementations, video sequence storing component 118 may be configured to store the viewable video sequence in a container, e.g., a standard container as commonly used to store 360-degree media content. For example, standard containers may contain media content in one or more specific resolutions and/or specific aspect ratios, including but not limited to a 16:9 aspect ratio. In some implementations, the container may be configured to contain 360-degree spherical video content. In some implementations, the container may be configured to contain 360-degree virtual reality content. In some implementations, the container may be configured to contain 360-degree spherical media content including both video content and virtual reality content.

Figure 7:
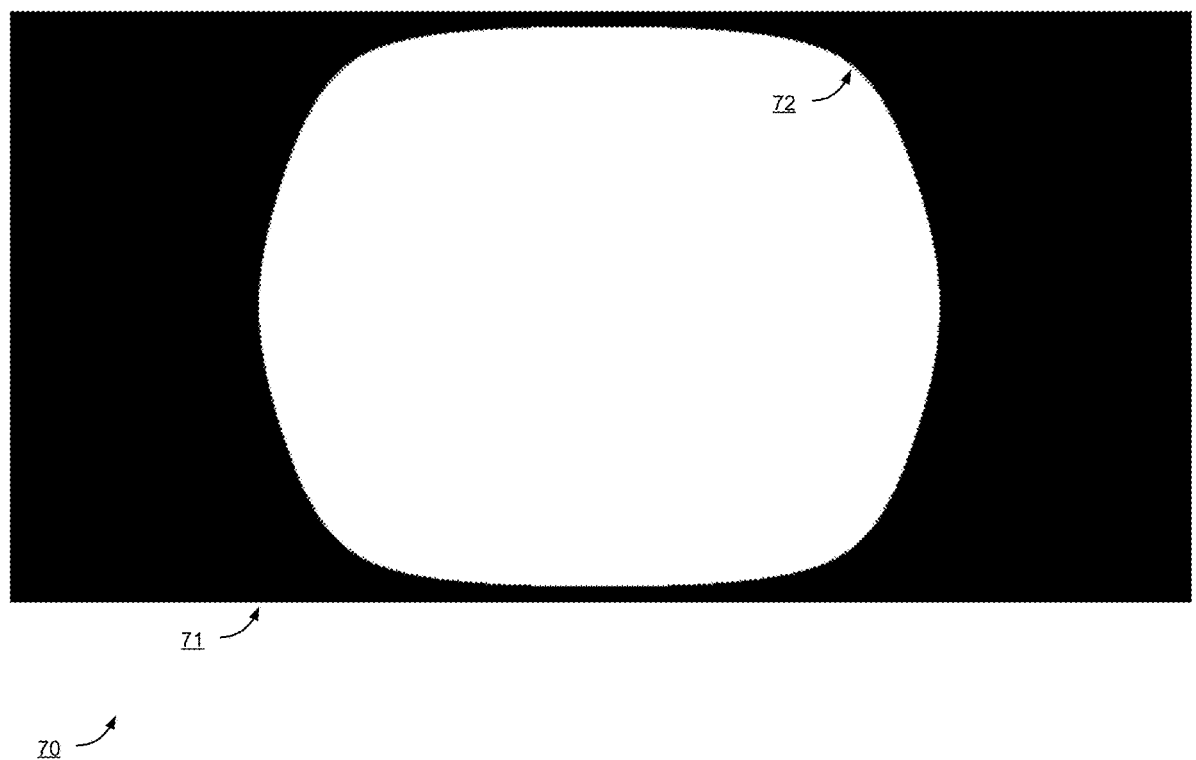
FIG. 7 illustrates an exemplary image representing a mask displaying a 200×180 degrees angle-of-view in a standard 360-degree container, as may be used by the system in accordance with one or more implementations.

By way of non-limiting example, FIG. 7 illustrates an exemplary image 70 representing a mask 72 displaying a 200×180 degrees angle-of-view in a standard container 71. Container 71 may be configured to contain 360-degree content in a 16:9 aspect ratio. The periphery of mask 72 represents the border of the viewable video sequence that is based on the selected portion of the captured wide-angled video information.

Position capture component 120 may be configured to capture a position of a virtual reality headset, such as virtual reality headset 136. The virtual headset may be worn by a user. Capturing the position of the virtual reality headset may include generating output signals by one or more of an accelerometer and/or a motion sensor, which may be included in the virtual reality headset. The generated output may signal convey information related to the position of the virtual reality headset. In some implementations, the generated output may signal convey information related to a change in the position of the virtual reality headset. The position may correspond to a viewing direction of the user.

Figure 8:
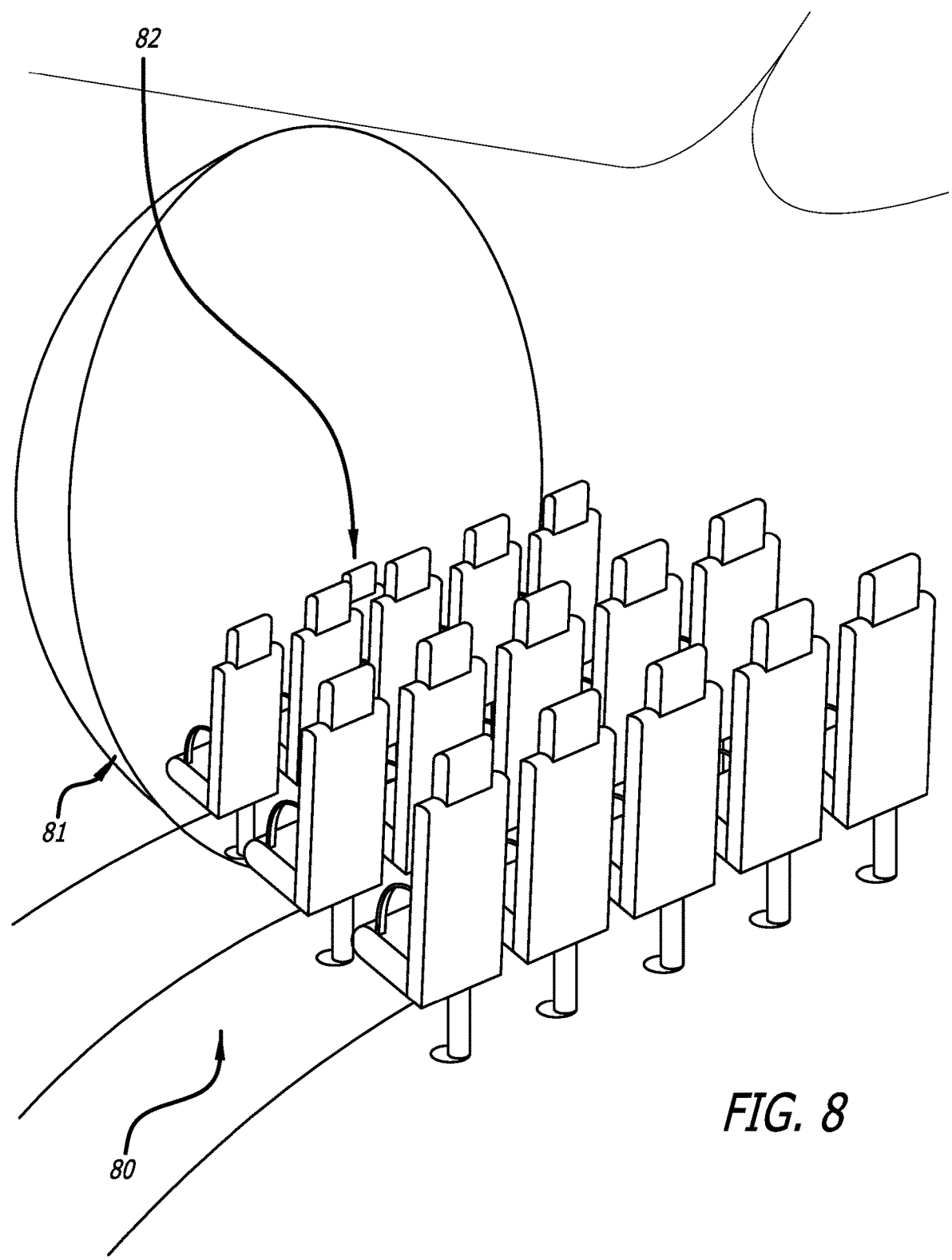
FIG. 8-9-10 illustrate exemplary images representing immersive virtual theatre environments including a dome shaped for immersive projection as may be used by a system
Figure 9:
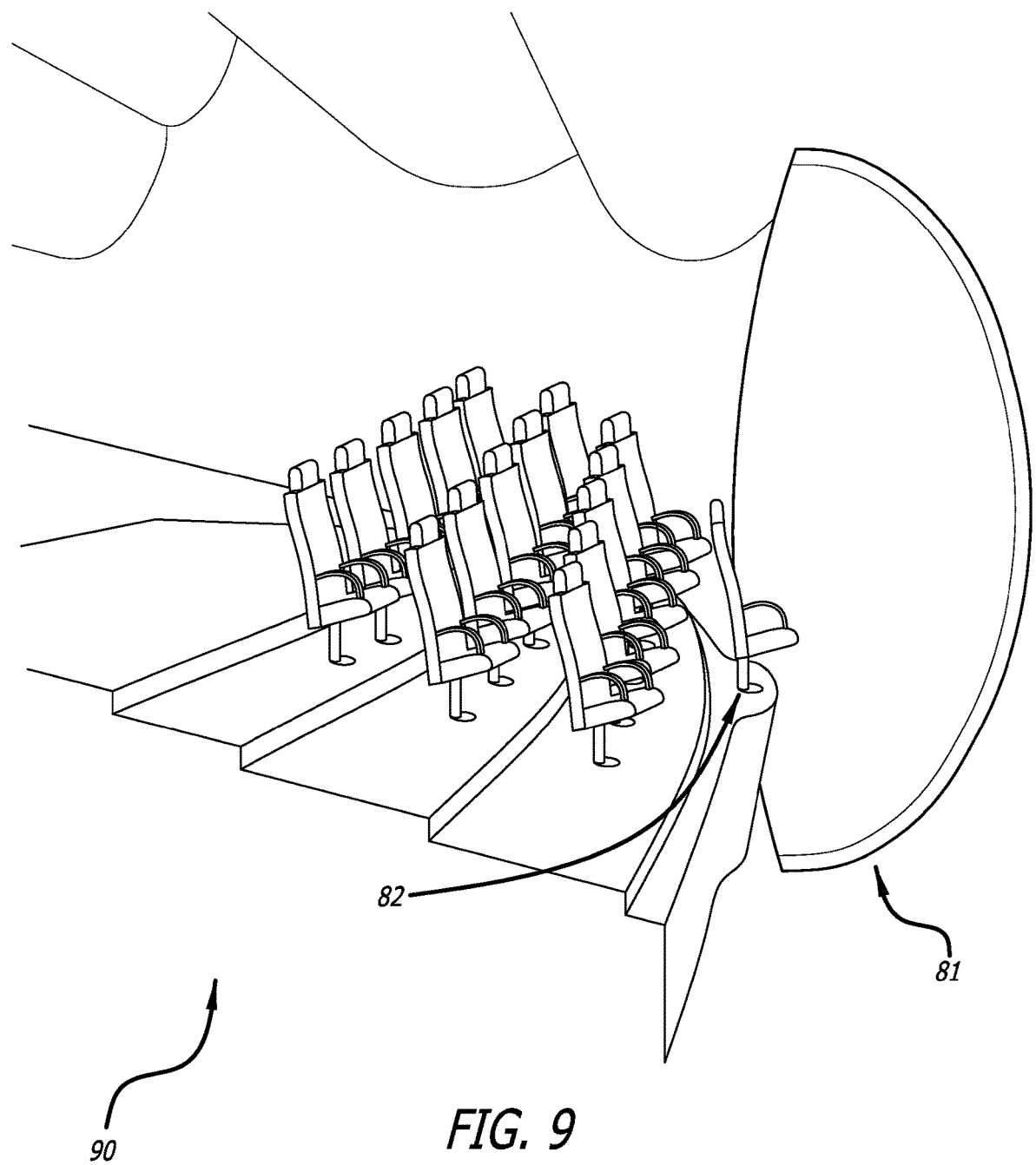
Figure 10:
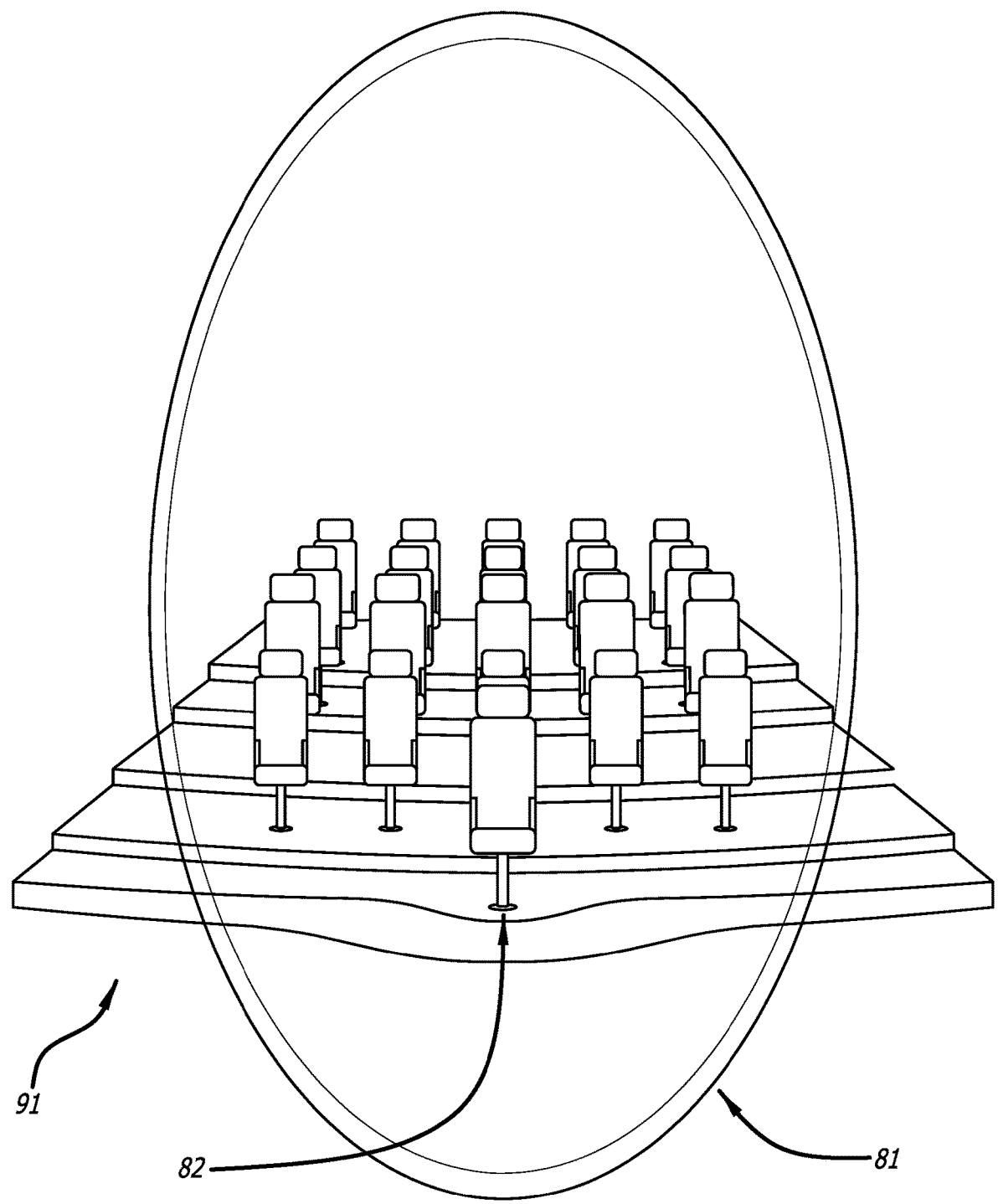

Playback component 122 may be configured to play back the video sequence in real-time or pseudo-real-time through the virtual reality headset such that the user experiences playback of the retrieved video sequence in accordance with the viewing direction of the user. In some implementations, playback of the retrieved video sequence may be performed by using an immersive virtual theatre environment that includes a dome specifically shaped (e.g., in terms of horizontal and vertical angle-of-view) to accommodate the video sequence. For example, the image presented to the user while wearing the virtual reality headset may have a horizontal angle-of-view that is smaller than the available horizontal angle-of-view of the stored viewable video sequence. As the user turns his head to the right, the presented image may effectively swivel and/or pan to the right within the available horizontal angle-of-view of the stored viewable video sequence. As the user turns his head to the left, the presented image may effectively swivel and/or pan to the left within the available horizontal angle-of-view of the stored viewable video sequence. Likewise, the image presented to the user while wearing the virtual reality headset may have a vertical angle-of-view that is smaller than the available vertical angle-of-view of the stored viewable video sequence. As the user tilts his head up, the presented image may effectively tilt up within the available horizontal angle-of-view of the stored viewable video sequence. As the user tilts his head down, the presented image may effectively tilt down within the available horizontal angle-of-view of the stored viewable video sequence. Combinations of swiveling and/or panning and tilting are envisioned within the scope of this disclosure. In some implementations, certain head movements of the user may correspond to zooming in and/or out. By way of non-limiting example, FIG. 8 illustrates an exemplary image 80 representing a view from the rear of an immersive virtual theatre environment including a dome 81 shaped for immersive projection of a video sequence, including but not limited to a video sequence retrieved by playback component 122. The horizontal and vertical angle-of-view from a viewer position 82 may be configured to provide an immersive experience to a user viewing from viewer position 82. The remaining elements in the immersive virtual theatre environment, such as additional chairs, may be merely for cosmetic purposes, and only visible to the user when the user turns around during playback. By way of non-limiting example, FIG. 9 illustrates an exemplary image 90 representing a view from the side of an immersive virtual theatre environment including dome 81 shaped for immersive projection of a video sequence to a viewer viewing from viewer position 82. By way of non-limiting example, as depicted in FIG. 9, the vertical angle-of-view from viewer position 82 is 180 degrees, and the horizontal angle-of-view from viewer position 82 is clearly more than the vertical angle-of-view, and about 200 to 220 degrees in this example. By way of non-limiting example, FIG. 10 illustrates an exemplary image 91 representing a view from the from of an immersive virtual theatre environment including dome 81 shaped for immersive projection of a video sequence to a viewer viewing from viewer position 82. Again, the remaining elements in the immersive virtual theatre environment of FIG. 10, such as additional chairs, may be merely for cosmetic purposes, and only visible to the user when the user turns around during playback.

Adjustment detection component 124 may be configured to detect an adjustment of the position of the virtual reality headset. The adjustment may be effectuated by movement of the user, including but not limited to head-movement. The adjustment of the position of the virtual reality headset may correspond to an adjustment of the viewing direction of the user. Playback component 122 may be configured to play back the video sequence in real-time or pseudo-real-time through the virtual reality headset in accordance with the adjustment of the viewing direction of the user.

Pattern positioning component 126 may be configured to position a known pattern in proximity of lens 108 such that the captured wide-angled image and/or video information includes a representation of the known pattern. Capturing images of a known pattern may be used to calibrate components of system 100.

Transformation calibration component 128 may be configured to calibrate the transformation of the selected portion into the rectilinear projection. In some implementations, transformation calibration component 128 may be configured to calibrate the transformation of the selected portion into the rectilinear projection based on the representation of a known pattern, e.g., the known pattern positioned by pattern positioning component 126. In some implementations, calibrating the transformation of the selected portion into the rectilinear projection may include performing an inverse mapping from individual pixels in the rectilinear projection to individual pixels in the captured wide-angled video information. In some implementations, calibration may be used to counteract irregularities in one or more of lens 108 and/or image sensor 110.

In some implementations, server(s) 102, client computing platform(s) 104, and/or external resources 130 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platform(s) 104, and/or external resources 130 may be operatively linked via some other communication media.

A given client computing platform 104 may include one or more processors configured to execute computer program components. The computer program components may be configured to enable an expert or user associated with the given client computing platform 104 to interface with system 100 and/or external resources 130, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 130 may include sources of information outside of system 100, external entities participating with system 100, and/or other resources. In some implementations, some or all of the functionality attributed herein to external resources 130 may be provided by resources included in system 100.

Server(s) 102 may include electronic storage 132, one or more processors 134, and/or other components. Server(s)

102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 132 may comprise non-transitory storage media that electronically stores information. The electronic storage media of electronic storage 132 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 132 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 132 may include one or more virtual storage resources (e.g., cloud storage, a virtual private network, and/or other virtual storage resources). Electronic storage 132 may store software algorithms, information determined by processor(s) 134, information received from server(s) 102, information received from client computing platform(s) 104, and/or other information that enables server(s) 102 to function as described herein.

Processor(s) 134 may be configured to provide information processing capabilities in server(s) 102. As such, processor(s) 134 may include one or more of a digital processor, an analog processor, a digital circuit designed to process information, an analog circuit designed to process information, a state machine, and/or other mechanisms for electronically processing information. Although processor(s) 134 is shown in FIG. 1 as a single entity, this is for illustrative purposes only. In some implementations, processor(s) 134 may include a plurality of processing units. These processing units may be physically located within the same device, or processor(s) 134 may represent processing functionality of a plurality of devices operating in coordination. Processor(s) 134 may be configured to execute components 112, 114, 116, 118, 120, 122, 124, 126, and/or 128, and/or other components. Processor(s) 134 may be configured to execute components 112, 114, 116, 118, 120, 122, 124, 126, and/or 128, and/or other components by software; hardware; firmware; some combination of software, hardware, and/or firmware; and/or other mechanisms for configuring processing capabilities on processor(s) 134. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 112, 114, 116, 118, 120, 122, 124, 126, and/or 128 are illustrated in FIG. 1 as being implemented within a single processing unit, in implementations in which processor(s) 134 includes multiple processing units, one or more of components 112, 114, 116, 118, 120, 122, 124, 126, and/or 128 may be implemented remotely from the other components. The description of the functionality provided by the different components 112, 114, 116, 118, 120, 122, 124, 126, and/or 128 described below is for illustrative purposes, and is not intended to be limiting, as any of components 112, 114, 116, 118, 120, 122, 124, 126, and/or 128 may provide more or less functionality than is described. For example, one or more of components 112, 114, 116, 118, 120, 122, 124, 126, and/or 128 may be eliminated, and some or all of its functionality may be provided by other ones of components 112, 114, 116, 118, 120, 122, 124, 126, and/or 128. As another example, processor(s) 134 may be configured to execute one or more additional components that may perform some or all of the functionality attributed below to one of components 112, 114, 116, 118, 120, 122, 124, 126, and/or 128.

Figure 2:
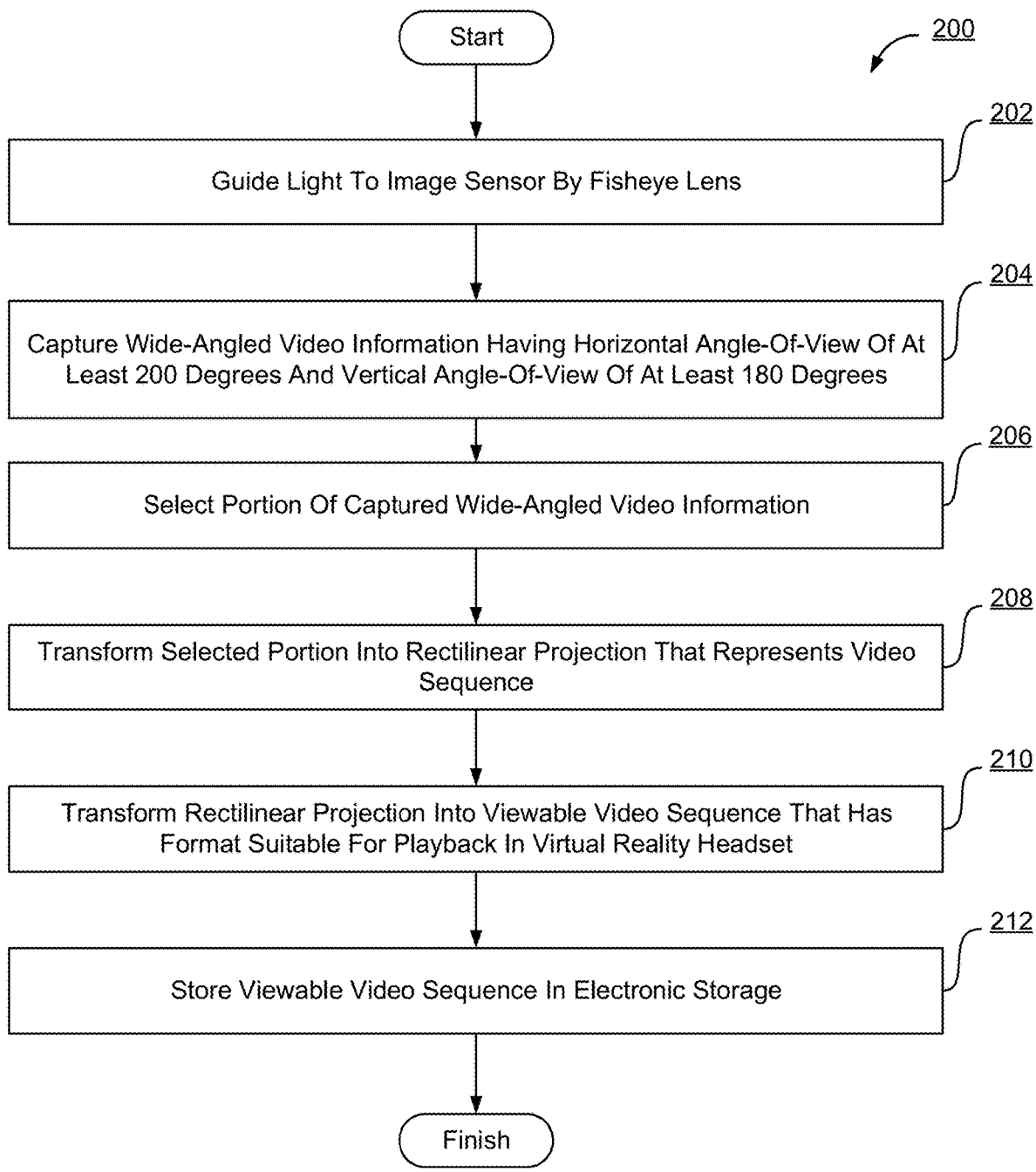
FIG. 2 includes a flow chart of a method for capturing and transforming wide-angle video information, in accordance with one or more implementations.

FIG. 2 illustrates a method 200 for capturing and transforming wide-angle video information, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may include guiding light to an image sensor by a fisheye lens. Operation 202 may be performed by a component that is the same as or similar to lens 108, in accordance with one or more implementations.

An operation 204 may include capturing, by the image sensor, wide-angled video information having a horizontal angle-of-view of at least 200 degrees and a vertical angle-of-view of at least 180 degrees. The wide-angled video information may be based on light that becomes incident on the image sensor. The wide-angled video information may represent a video sequence. Operation 204 may be performed by a component that is the same as or similar to image sensor 110, in accordance with one or more implementations.

An operation 206 may include selecting a portion of the captured wide-angled video information. The selected portion may have a horizontal angle-of-view of at least 200 degrees and no more than 250 degrees. The selected portion may have a vertical angle-of-view of at least 180 degrees. The vertical angle-of-view of the selected portion may have fewer degrees than the horizontal angle-of-view of the selected portion. Operation 206 may be performed by one or more hardware processors configured by machine-readable instructions including a component that is the same as or similar to portion selection component 112, in accordance with one or more implementations.

An operation 208 may include transforming the selected portion into a rectilinear projection that represents the video sequence. The rectilinear projection may have a horizontal angle-of-view of at least 200 degrees and no more than 250 degrees. The rectilinear projection may have a vertical angle-of-view of at least 180 degrees. The vertical angle-of-view of the rectilinear projection may have fewer degrees than the horizontal angle-of-view of the rectilinear projection. Operation 208 may be performed by one or more hardware processors configured by machine-readable instructions including a component that is the same as or similar to portion transformation component 114, in accordance with one or more implementations.

An operation 210 may include transforming the rectilinear projection into a viewable video sequence that has a format suitable for playback in a virtual reality headset. Operation 210 may be performed by one or more hardware processors configured by machine-readable instructions including a component that is the same as or similar to projection transformation component 116, in accordance with one or more implementations.

An operation 212 may include storing the viewable video sequence in electronic storage. Operation 212 may be performed by one or more hardware processors configured by machine-readable instructions including a component that is the same as or similar to video sequence storing component 118, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured for capturing and transforming wide-angle video information, the system comprising:
    a fisheye lens configured to guide light to an image sensor;
    the image sensor configured to capture wide-angled video information having a horizontal angle-of-view of 200 degrees or more and a vertical angle-of-view of 180 degrees or more, wherein the wide-angled video information is based on light that becomes incident on the image sensor, wherein the wide-angled video information represents a video sequence;
    one or more hardware processors configured by machine-readable instructions to:
        select a portion of the captured wide-angled video information, wherein the selected portion has a horizontal angle-of-view between 200 degrees and 250 degrees, wherein the selected portion has a vertical angle-of-view of 180 degrees or more, and wherein the vertical angle-of-view of the selected portion has fewer degrees than the horizontal angle-of-view of the selected portion;
        transform the selected portion into a rectilinear projection that represents the video sequence, wherein the rectilinear projection has a horizontal angle-of-view between 200 degrees and 250 degrees, wherein the rectilinear projection has a vertical angle-of-view of 180 degrees or more, and wherein the vertical angle-of-view of the rectilinear projection has fewer degrees than the horizontal angle-of-view of the rectilinear projection;
        transform the rectilinear projection into a viewable video sequence that has a format suitable for playback in a virtual reality headset; and
        store the viewable video sequence in electronic storage.

2. The system of claim 1, wherein the one or more hardware processors are further configured by machine-readable instructions to:
    capture a position of the virtual reality headset, wherein the virtual headset is worn by a user, wherein the position corresponds to a viewing direction of the user;
    play back the video sequence in real-time or pseudo-real-time through the virtual reality headset such that the user experiences playback of the retrieved video sequence in accordance with the viewing direction of the user;
    detect an adjustment of the position of the virtual reality headset, wherein the adjustment is effectuated by movement of the user, wherein the adjustment of the position of the virtual reality headset corresponds to an adjustment of the viewing direction of the user; and
    play back the video sequence in real-time or pseudo-real-time through the virtual reality headset in accordance with the adjustment of the viewing direction of the user.

3. The system of claim 2, wherein capturing the position of the virtual reality headset includes generating output signals by one or more of an accelerometer and/or a motion sensor, and wherein the generated output signals convey information related to the position of the virtual reality headset.

4. The system of claim 1, wherein the one or more hardware processors are further configured by machine-readable instructions to:
    position a known pattern in proximity of the fisheye lens such that the captured wide-angled video information includes a representation of the known pattern;
    calibrate the transformation of the selected portion into the rectilinear projection based on the representation of the known pattern.

5. The system of claim 4, wherein calibrating the transformation of the selected portion into the rectilinear projection includes performing an inverse mapping from individual pixels in the rectilinear projection to individual pixels in the captured wide-angled video information.

6. The system of claim 1, wherein transforming the selected portion into the rectilinear projection is performed such that vertical lines in captured real-world images correspond to vertical lines in the rectilinear projection.

7. The system of claim 1, wherein transforming the rectilinear projection into the viewable video sequence is performed such that the format suitable for playback in the virtual reality headset is a proprietary lat-long format.

8. The system of claim 7, wherein the proprietary lat-long format is compressed horizontally such that a first sub-portion in the center of the captured wide-angled video information is compressed less than a second sub-portion at the periphery of the captured wide-angled video information.

9. The system of claim 1, wherein the horizontal angle-of-view of the capture wide-angled video information ranges between 220 and 250 degrees, wherein the selected portion of the captured wide-angled video information is centered horizontally in the captured wide-angled video information.

10. The system of claim 1, wherein the rectilinear projection includes more than 90% of the information in the selected portion.

11. A method for capturing and transforming wide-angle video information, the method comprising:

guiding light to an image sensor by a fisheye lens;

capturing, by the image sensor, wide-angled video information having a horizontal angle-of-view of 200 degrees or more, wherein the wide-angled video information is based on light that becomes incident on the image sensor, and wherein the wide-angled video information represents a video sequence;

selecting a portion of the captured wide-angled video information, wherein the selected portion has a horizontal angle-of-view between 200 degrees and 250 degrees, and wherein the selected portion has a vertical angle-of-view of fewer degrees than the horizontal angle-of-view of the selected portion;

transforming the selected portion into a rectilinear projection that represents the video sequence, wherein the rectilinear projection has a horizontal angle-of-view between 200 degrees and 250 degrees, and wherein the rectilinear projection has a vertical angle-of-view of fewer degrees than the horizontal angle-of-view of the rectilinear projection;

transforming the rectilinear projection into a viewable video sequence that has a format suitable for playback in a virtual reality headset; and storing the viewable video sequence in electronic storage;

wherein the vertical angle-of-view of the selected portion is at least 180 degrees but fewer degrees than the horizontal angle-of-view of the selected portion.

12. The method of claim 11, further comprising:

capturing a position of the virtual reality headset, wherein the virtual headset is worn by a user, wherein the position corresponds to a viewing direction of the user;

playing back the video sequence in real-time or pseudo-real-time through the virtual reality headset such that the user experiences playback of the retrieved video sequence in accordance with the viewing direction of the user;

detecting an adjustment of the position of the virtual reality headset, wherein the adjustment is effectuated by movement of the user, wherein the adjustment of the position of the virtual reality headset corresponds to an adjustment of the viewing direction of the user; and playing back the video sequence in real-time or pseudo-real-time through the virtual reality headset in accordance with the adjustment of the viewing direction of the user.

13. The method of claim 12, wherein capturing the position of the virtual reality headset includes generating output signals by one or more of an accelerometer and/or a motion sensor, and wherein the generated output signals convey information related to the position of the virtual reality headset.

14. The method of claim 11, further comprising:

positioning a known pattern in proximity of the fisheye lens such that the captured wide-angled video information includes a representation of the known pattern; and calibrating the transformation of the selected portion into the rectilinear projection based on the representation of the known pattern.

15. The method of claim 14, wherein calibrating the transformation of the selected portion into the rectilinear projection includes performing an inverse mapping from individual pixels in the rectilinear projection to individual pixels in the captured wide-angled video information.

16. The method of claim 11, wherein transforming the selected portion into the rectilinear projection is performed such that vertical lines in captured real-world images correspond to vertical lines in the rectilinear projection.

17. The method of claim 11, wherein transforming the rectilinear projection into the viewable video sequence is performed such that the format suitable for playback in the virtual reality headset is a proprietary lat-long format.

18. The method of claim 17, wherein the proprietary lat-long format is compressed horizontally such that a first sub-portion in the center of the captured wide-angled video information is compressed less than a second sub-portion at the periphery of the captured wide-angled video information.

19. The method of claim 11, wherein the horizontal angle-of-view of the capture wide-angled video information ranges between 220 and 250 degrees, wherein the selected portion of the captured wide-angled video information is centered horizontally in the captured wide-angled video information.

20. The method of claim 11, wherein the rectilinear projection includes more than 90% of the information in the selected portion.

21. A method for capturing and transforming wide-angle video information, the method comprising:

guiding light to an image sensor by a fisheye lens;

capturing, by the image sensor, wide-angled video information having a horizontal angle-of-view of 200 degrees or more, wherein the wide-angled video information is based on light that becomes incident on the image sensor, and wherein the wide-angled video information represents a video sequence;

selecting a portion of the captured wide-angled video information, wherein the selected portion has a horizontal angle-of-view between 200 degrees and 250 degrees, and wherein the selected portion has a vertical angle-of-view of fewer degrees than the horizontal angle-of-view of the selected portion;

transforming the selected portion into a rectilinear projection that represents the video sequence, wherein the rectilinear projection has a horizontal angle-of-view between 200 degrees and 250 degrees, and wherein the rectilinear projection has a vertical angle-of-view of fewer degrees than the horizontal angle-of-view of the rectilinear projection;

transforming the rectilinear projection into a viewable video sequence that has a format suitable for playback in a virtual reality headset; and storing the viewable video sequence in electronic storage;

wherein transforming the rectilinear projection into the viewable video sequence is performed such that the format suitable for playback in the virtual reality headset is a proprietary lat-long format; and wherein the proprietary lat-long format is compressed horizontally such that a first sub-portion in the center of the captured wide-angled video information is compressed less than a second sub-portion at the periphery of the captured wide-angled video information.

* * * * *